(12) United States Patent
Donaldson

(10) Patent No.: US 7,174,853 B1
(45) Date of Patent: Feb. 13, 2007

(54) PORTABLE ALLEY WAY WITH COLLAPSIBLE CROWDING TUB FOR CATTLE

(76) Inventor: Dwight E. Donaldson, 552 Hitchcock Rd., Denton, MT (US) 59430

( * ) Notice: Subject to any disclaimer, the term of this patent is extended or adjusted under 35 U.S.C. 154(b) by 177 days.

(21) Appl. No.: 11/055,020

(22) Filed: Feb. 10, 2005

Related U.S. Application Data (60) Provisional application No. 60/543,213, filed on Feb. 10, 2004.

(51) Int. Cl.
*A01K 1/00* (2006.01)

(52) U.S. Cl. .................................. 119/512; 119/843

(58) Field of Classification Search ............... 119/502, 119/510, 512, 514, 843
See application file for complete search history.

(56) References Cited

U.S. PATENT DOCUMENTS

| | | | | |
|---|---|---|---|---|
| 1,330,404 A | * | 2/1920 | Sommer | 119/502 |
| 4,535,723 A | * | 8/1985 | Gealy | 119/502 |
| 4,829,936 A | | 5/1989 | Mollhagen | |
| 4,836,143 A | * | 6/1989 | Shadbolt, Jr. | 119/514 |
| 4,898,121 A | * | 2/1990 | Reynolds | 119/752 |
| 4,960,074 A | | 10/1990 | Wilson | |
| RE33,959 E | | 6/1992 | Mollhagen | |
| 5,381,757 A | | 1/1995 | Putney | |
| 6,021,742 A | | 2/2000 | Cummings | |
| 6,067,940 A | | 5/2000 | Holder | |
| 6,499,435 B2 | * | 12/2002 | Markham | 119/512 |

FOREIGN PATENT DOCUMENTS

GB 2212702 A * 8/1989

* cited by examiner

*Primary Examiner*—Son T. Nguyen
*Assistant Examiner*—Bethany L. Griles
(74) *Attorney, Agent, or Firm*—Richard C. Conover (57) ABSTRACT

The present invention includes a portable alley way having openings at one end. A collapsible crowding tub is connected to the alley way and includes an opening communicating with the opening of the alley way. The collapsible crowding tub includes a plurality of curved panels which are connected together in a substantially semi-circular pattern surrounding a fifth wheel hitch. An end curved panel is connected to the alley way adjacent the opening of the alley way. An extension panel has one end connected to the alley way on the opposite side of the opening of the alley way and has a second end connected to the fifth wheel gooseneck. A gate has one end pivotably attached to the fifth wheel gooseneck and is sized to swing in an arc within the semi-circular pattern of the curved panels. A latch is provided for latching the gate to a selected curved panel.

3 Claims, 12 Drawing Sheets

PORTABLE ALLEY WAY WITH COLLAPSIBLE CROWDING TUB FOR CATTLE

This application claims the benefit of provisional application Ser. No. 60/543,213 filed Feb. 10, 2004.

BACKGROUND OF THE INVENTION

The present invention relates to a portable alley way with a collapsible crowding tub for livestock animals such as cattle. With this apparatus, the alley way may be transported to where the cattle are located and eliminates the need to move the cattle to a fixed alley way.

Portable livestock working systems are known such as described in U.S. Pat. No. Re. 33,959 to Mollhagen and U.S. Pat. No. 4,898,121 to Reynolds.

The present invention is an improvement over the known portable livestock systems in that it utilizes a fifth wheel gooseneck as a center column for supporting a series of curved panels forming a crowding tub connected to a portable alley way. The present invention is easily carried with a truck having a fifth wheel hitch. The collapsible tub is easily assembled in the field and also easily disassembled for transportation to another location.

SUMMARY OF THE INVENTION

The present invention relates to a portable alley way having opposed first and second sides with a top and a bottom and an opening at a first end and an opening at a second end. A collapsible crowding tub is provided having an opening communicating with the opening at the second end of the alley way. The collapsible crowding tub includes a top brace extending from the top of the second end of the alley way to a fifth wheel gooseneck and a plurality of curved panels which are connected together end-to-end in a substantially semi-circular pattern surrounding the fifth wheel hitch in equidistance, spaced-apart relation thereto. An end curved panel is connected to the first side of the alley way adjacent the opening at the second end of alley way. An extension panel has one end connected to the second side of the alley way adjacent the opening at the second end of the alley way and has a second end connected to the fifth wheel gooseneck. A plurality of rod brace members are provided wherein each rod brace member extends from the fifth wheel gooseneck to one of the curved panels. A gate has one end pivotably attached to the fifth wheel gooseneck and is sized to swing in an arc within the semi-circular pattern of the curved panels, and finally a means is provided for latching the gate to a selected curved panel.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF PREFERRED EMBODIMENTS

Figure 1:
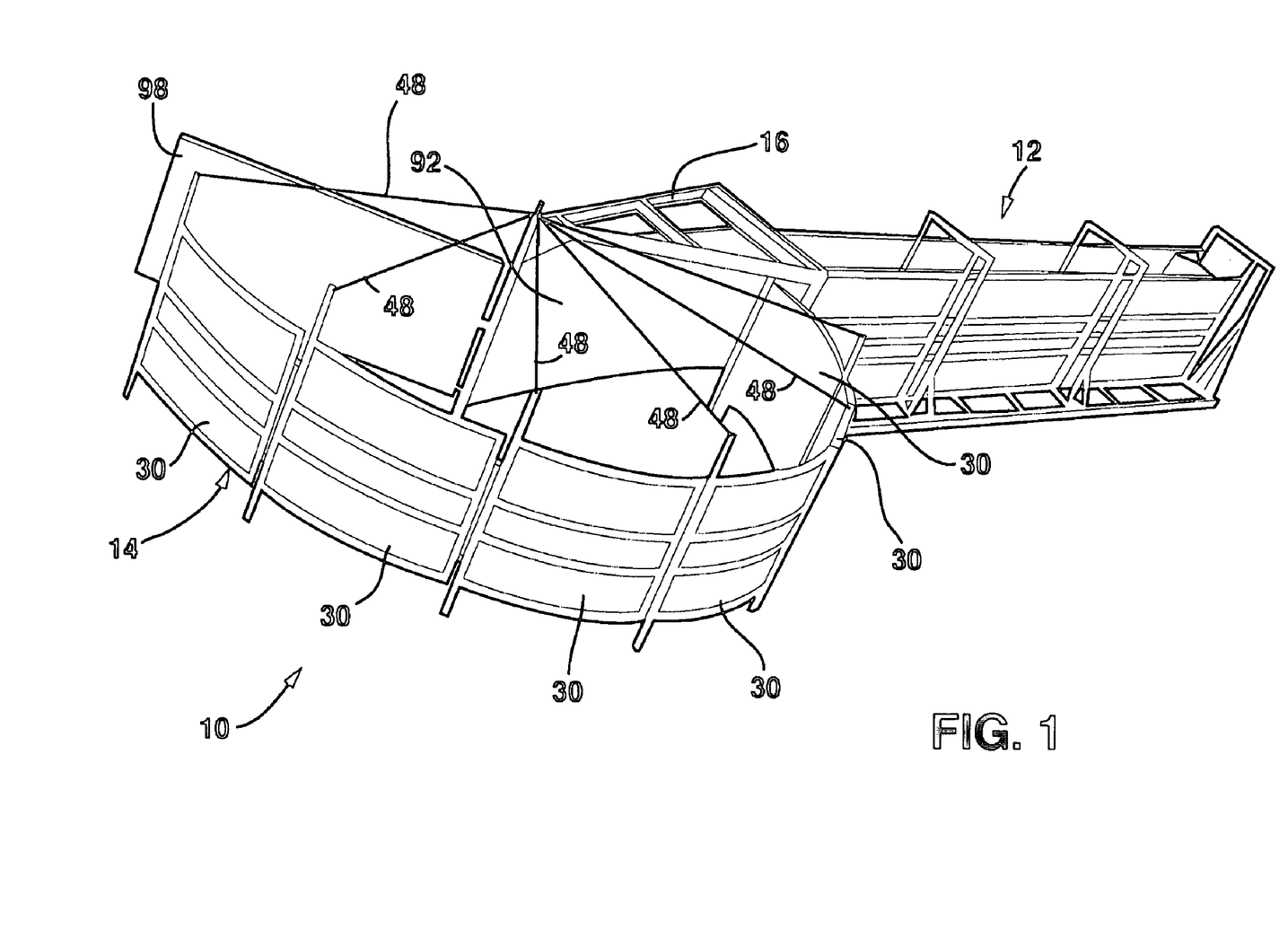
FIG. 1 is a perspective photograph of a portable alley way with self-supporting crowding tub according to the present invention.
Figure 2:
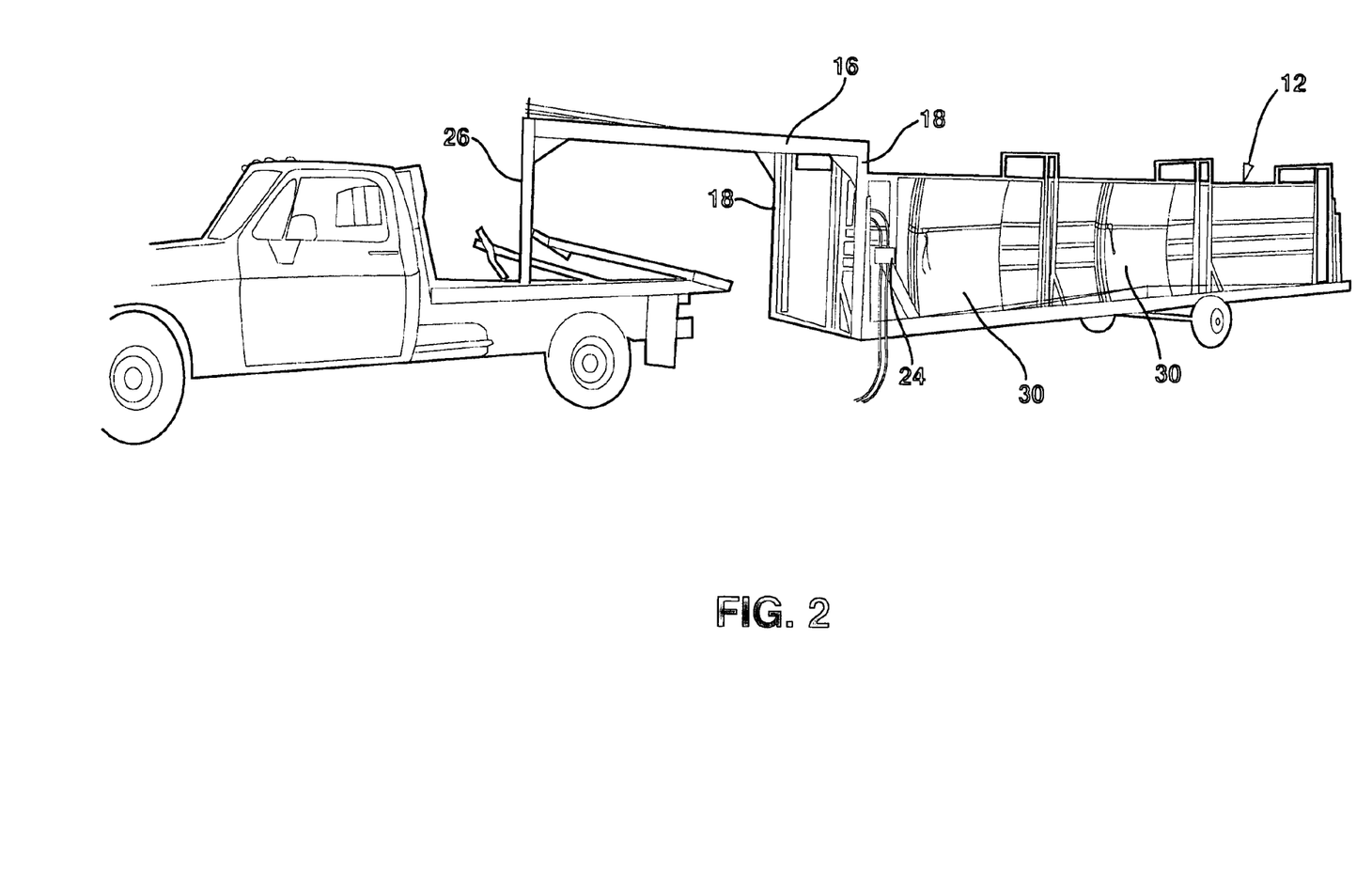
FIG. 2 is a perspective photograph of the portable alley way shown in FIG. 1 in a collapsed condition, ready for transport.
Figure 3:
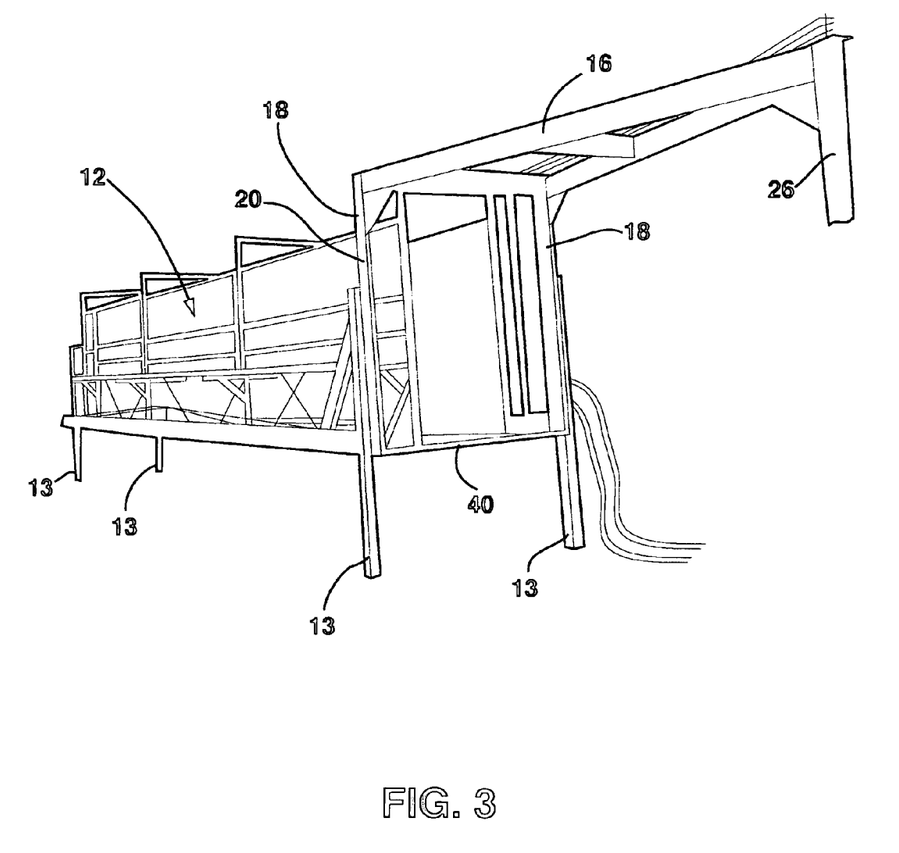
FIG. 3 is an end perspective photograph of an alley way used with the present invention with parts removed.

A portable alley way with self-supporting crowding tub for cattle 10 according to the present invention, is shown in FIG. 1. The invention 10 includes a conventional portable alley way 12 to which is a attached a portable crowding tub 14. FIG. 2 shows the invention 10 with the tub in a collapsed condition. A triangular overhead brace 16 is welded to a pair of uprights 18 and 20, as shown in FIG. 3. The uprights 18 and 20 are welded to the frame of the conventional alley way 12.

Figure 4:
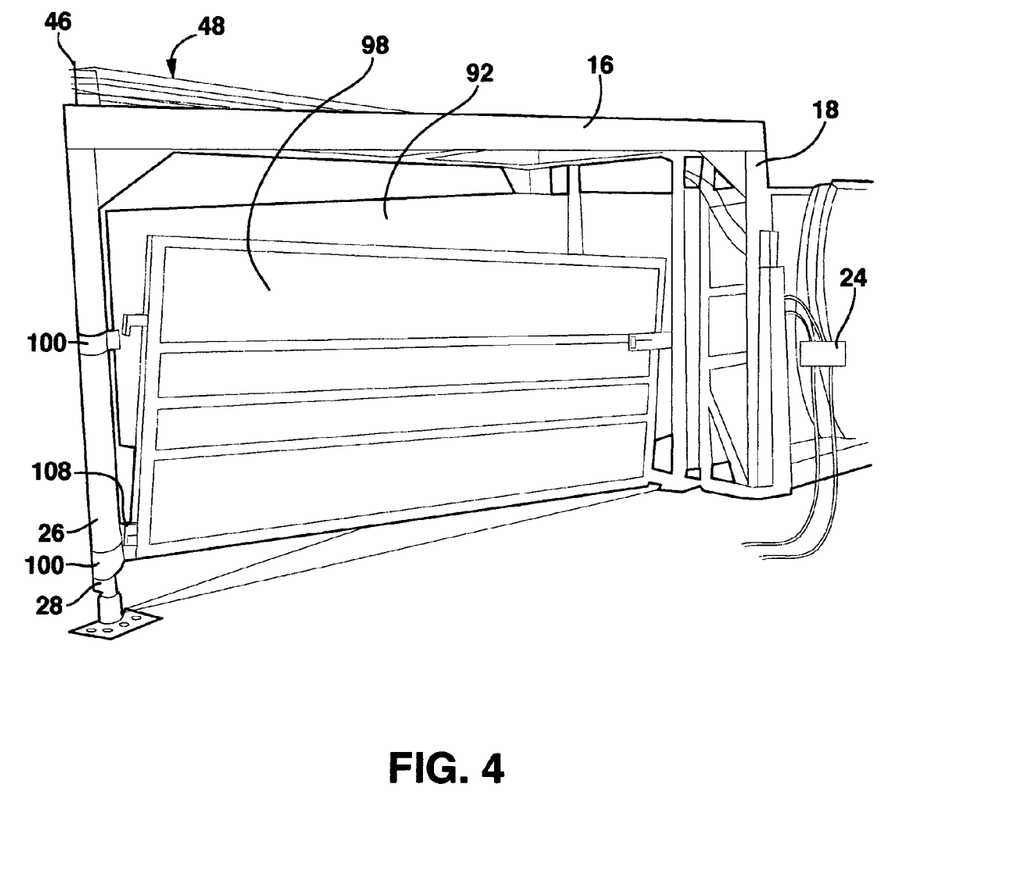
FIG. 4 is a detail perspective photograph of the present invention with parts removed.

Four conventional hydraulic lifters 13 are secured to each corner of the alley way 12, as shown in FIG. 3. The lifters 22 are hydraulically controlled with a conventional controller 24 mounted to a side of the alley way 12, as shown in FIG. 4.

The apex of the overhead triangular brace 16 is secured to an upright gooseneck 26, as shown in FIGS. 2 and 3. At the distal end of upright gooseneck 26, a ball receiving hitch 28, as shown in FIG. 4, is secured for receiving a hitch ball (not shown) provided on the towing vehicle, as shown in FIG. 2.

Figure 5:
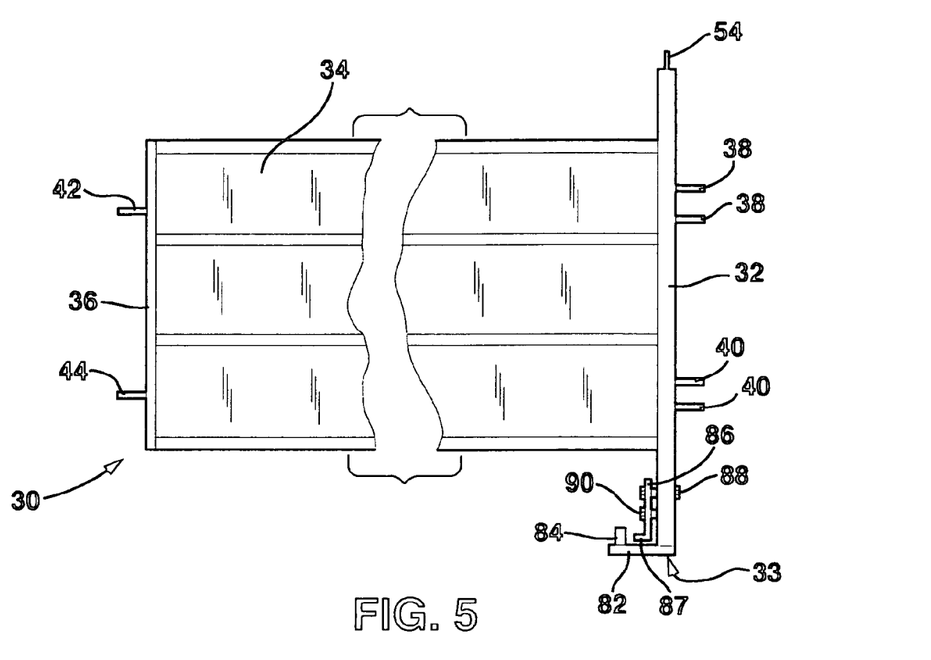
FIG. 5 is an elevational view of a tub panel used with the present invention.

A series of six panels 30 are arranged in an essentially semi-circular pattern to form the crowding tub 14, as shown in FIG. 1. A detail view of a single panel 30 is shown in FIG. 5. Each panel 30 includes an end upright standard 32 having one end 33 for resting on a ground surface. The panel 30 further includes a panel body 34 and an end upright standard 36 secured at the distal end of the panel body, as shown in FIG. 5. The upright standard 32 has an upper pair of plates 38 welded to the upright standard 32 extending in an outward direction, as shown in FIG. 5. The upright standard 32 is further provided with a lower pair of spaced apart plates 40 which are spaced apart from the upper plates 38. The plates 38 and the plates 40 each have an aligned bore therethrough for receiving a connecting pin.

The upright standard 36 is provided with an upper tongue 42 and a lower tongue 44. Each of the tongues 42 and 44 have a bore therethrough for receiving a pin. The tongues 42 and 44 are positioned to extend between the respective plates 38 and 40 of an adjacent panel 30 so that when a pin is inserted through the hole provided in plates 38 and tongue 42 and another pin inserted through the hole provided in plates 40 and tongues 44, adjacent panels are connected together.

As shown in FIG. 4, a similar upper pair of plates 38 and a lower pair of plates 40 are secured to an end frame of the alley way 12 for receiving the tongues 42 and 44, respectively, of the first panel to be joined to the alley way 12.

Figure 6:
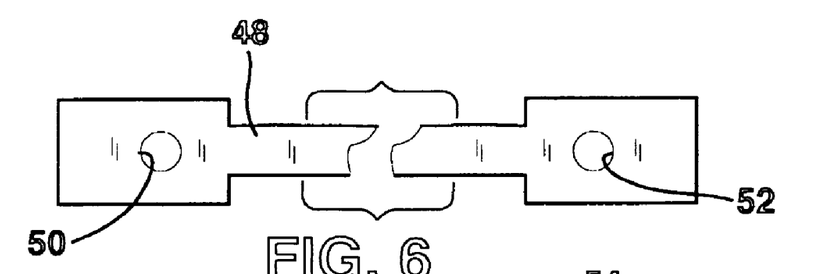
FIG. 6 is a plan view of a stabilizing rod used with the present invention.

The upright standard 26 of the fifth wheel hitch is provided with an upstanding pin 46, as shown in FIG. 4. Six stabilizing rods 48 are mounted on the pin 46. As shown in FIG. 6, each rod 48 has a hole 50 and 52 provided therein. Each rod 48 is inserted on pin 46 by threading the pin 46 through a respective hole 50.

Each upright standard 32 of panel 30 is provided with an upright pin 54, as shown in FIG. 5. The hole 52 of each rod 48 is then threaded on a pin 54 of one panel with one rod extending to one panel, as shown in FIG. 1.

Figure 7:
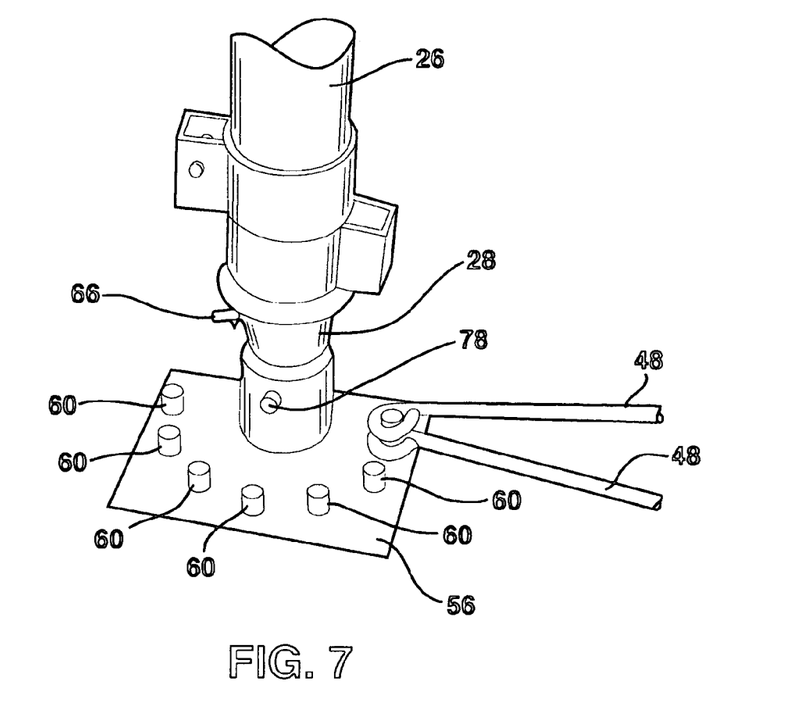
FIG. 7 is a detail perspective view of a rod support plate used with the present invention.
Figure 8:
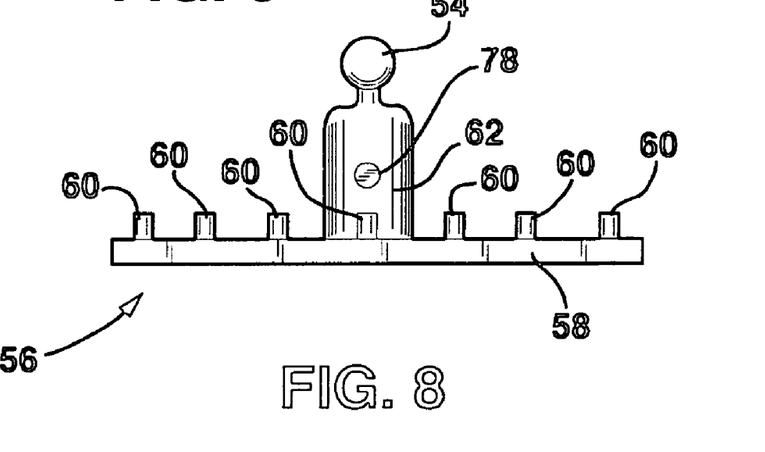
FIG. 8 is an elevational view of the rod support plate shown in FIG. 7.

When the invention 10 is removed from the vehicle and is to be used as a crowding tub and alley way, a rod support plate 56 is mounted to the ball receiving hitch 28 secured to the upright gooseneck 26, as shown in FIG. 7. A detail view of the rod support plate 56 is shown in FIG. 8. The rod support plate includes a body portion 58 on which a series of upright pins 60 are secured as by welding. Further, a ball mount 62 is welded to the body portion 58 and supports a hitch ball 54 to be received by the ball receiving hitch 28 attached to the upright gooseneck 26. A conventional locking pin 66, as shown in FIG. 7, is used to lock the ball 54 within the ball receiving hitch 28.

Figure 9:
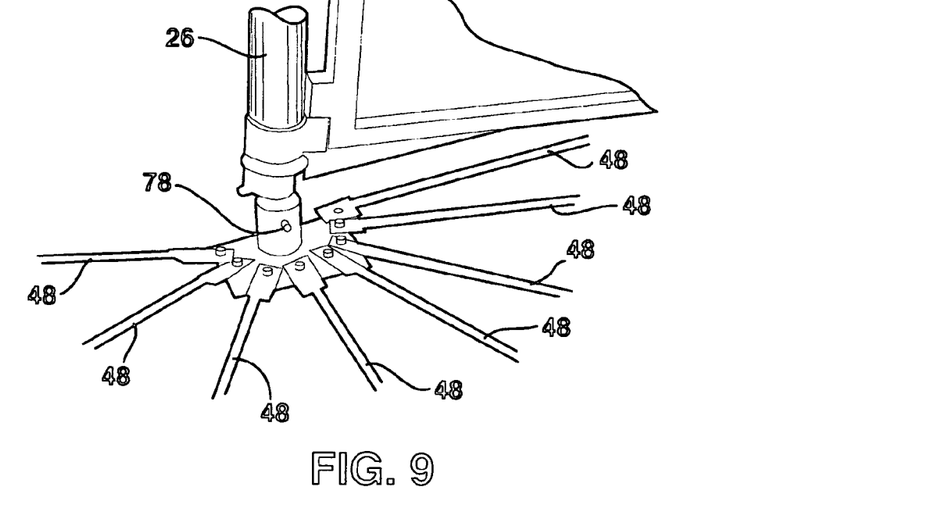
FIG. 9 is a detail perspective view of the rod support plate shown in FIG. 7.

Stabilizing rods 48 are then positioned so that each of the pins 60 receive one rod 48 with the hole 50 being threaded over a respective pin 60. FIG. 9 shows the rods 48 inserted on pins 60.

Figure 8A:
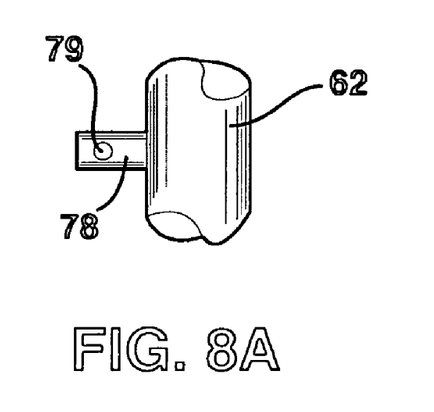
FIG. 8A is a detail view of a locking post shown in FIG. 8.
Figure 10:
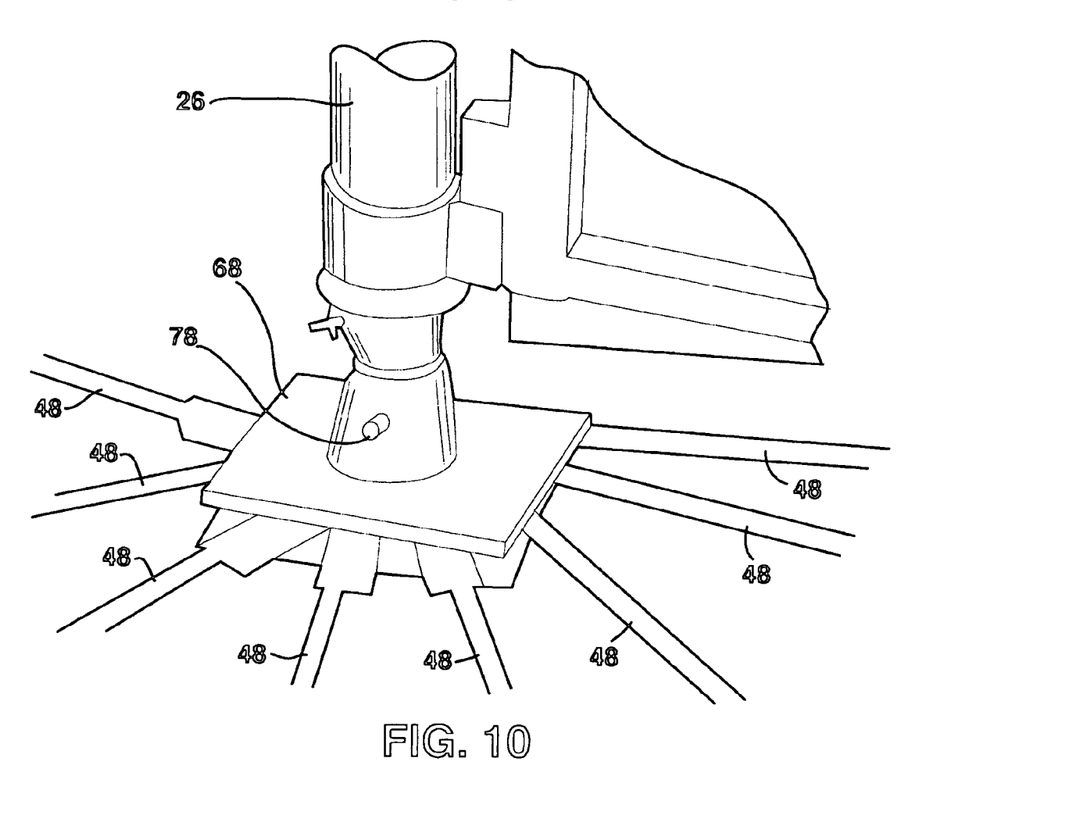
FIG. 10 is a detail perspective view of a rod locking plate used with the present invention.
Figure 11:
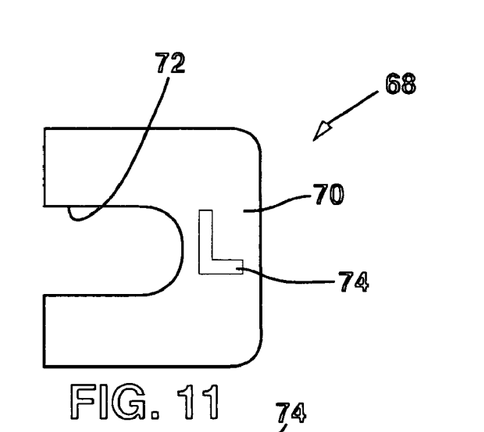
FIG. 11 is a plan view of the rod locking plate shown in FIG. 10.
Figure 12:
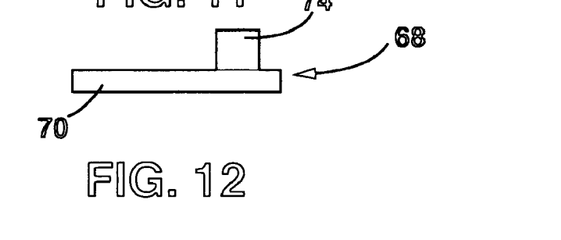
FIG. 12 is an elevational view of the rod locking plate shown in FIG. 11.
Figure 13:
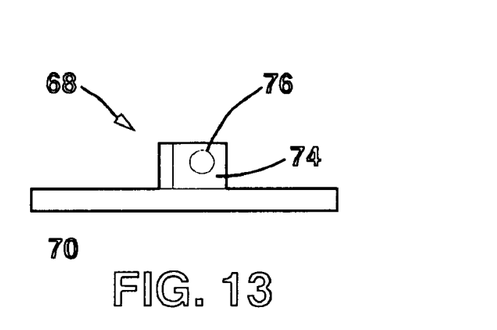
FIG. 13 is an end view of the rod locking plate shown in FIG. 11.

A locking plate 68 is positioned over the rods 48 to hold the rods 48 on the pins 60, as shown in FIG. 10. A detail view of the locking plate is shown in FIGS. 11–13. The locking plate 68 includes a body plate 70 which has a cutout 72 sized to receive the ball mount 62, as shown in FIG. 10. An upright plate 74 is secured to the body portion 70. The plate 74 includes a bore 76 which is positioned to receive a post 78 secured to the ball mount 62, as shown in FIG. 8. The post 78 includes a transverse bore 79, as shown in FIG. 8A. When the post 78 is inserted through bore 76, a pin (not shown) is inserted through bore 79 to hold the locking plate 68 over the rods 48.

Figure 14:
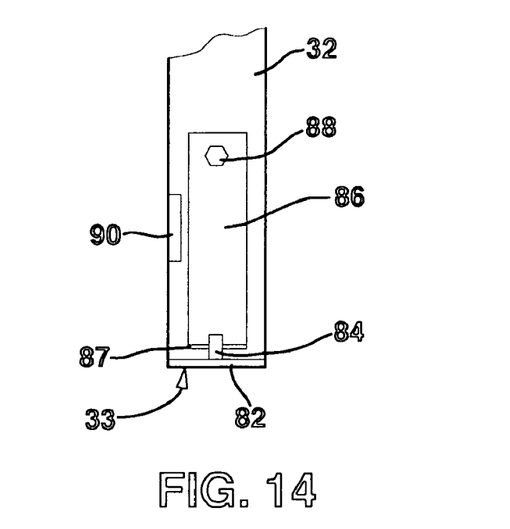
FIG. 14 is a detail view of a rod locking leg used with the present invention.
Figure 15:
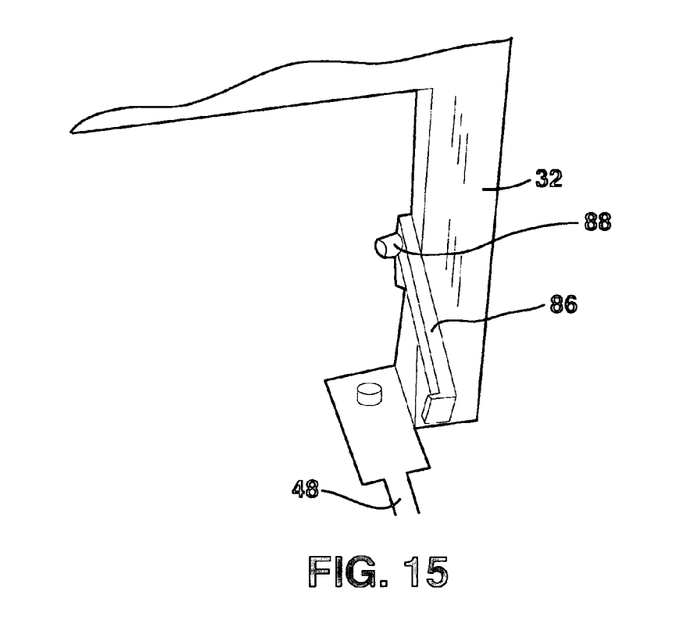
FIG. 15 is a detail photograph of the rod locking leg shown in FIG. 14 with the leg swung outwardly.

The distal end 33 of upright standard 32 is shown in FIGS. 5 and 14. A plate bracket 82 is welded to the distal end 33 of the standard 32, as shown in FIGS. 5 and 14. An upright pin 84 is welded to the leg bracket 82. The pin 84 is used for receiving the hole 52 of the stabilizer rod 48. A locking leg 86 has one end pivotally mounted to the standard 32 with a bolt 88. The locking leg 86 has a laterally extending arm 87 mounted to the free end of leg 86. A stop plate 90 is welded to the standard 32 to stop the swinging movement of the locking leg 86. In use, the locking leg 86 is swung outwardly, as shown in FIG. 15, and the hole 52 of stabilizer rod 48 inserted over pin 84. The leg 86 is then allowed to swing over the stabilizer rod 48 whereby the arm 87 holds the stabilizer rod 48 in place.

Figure 16:
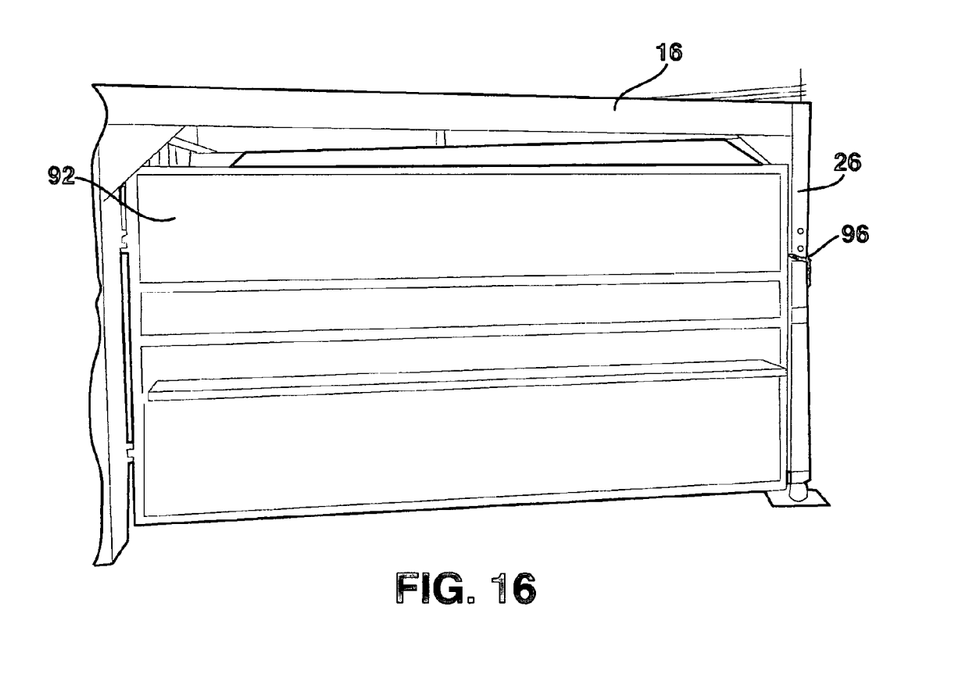
FIG. 16 is a perspective photograph of an alley way extension panel used with the present invention.
Figures 17, 18, 19, 20:
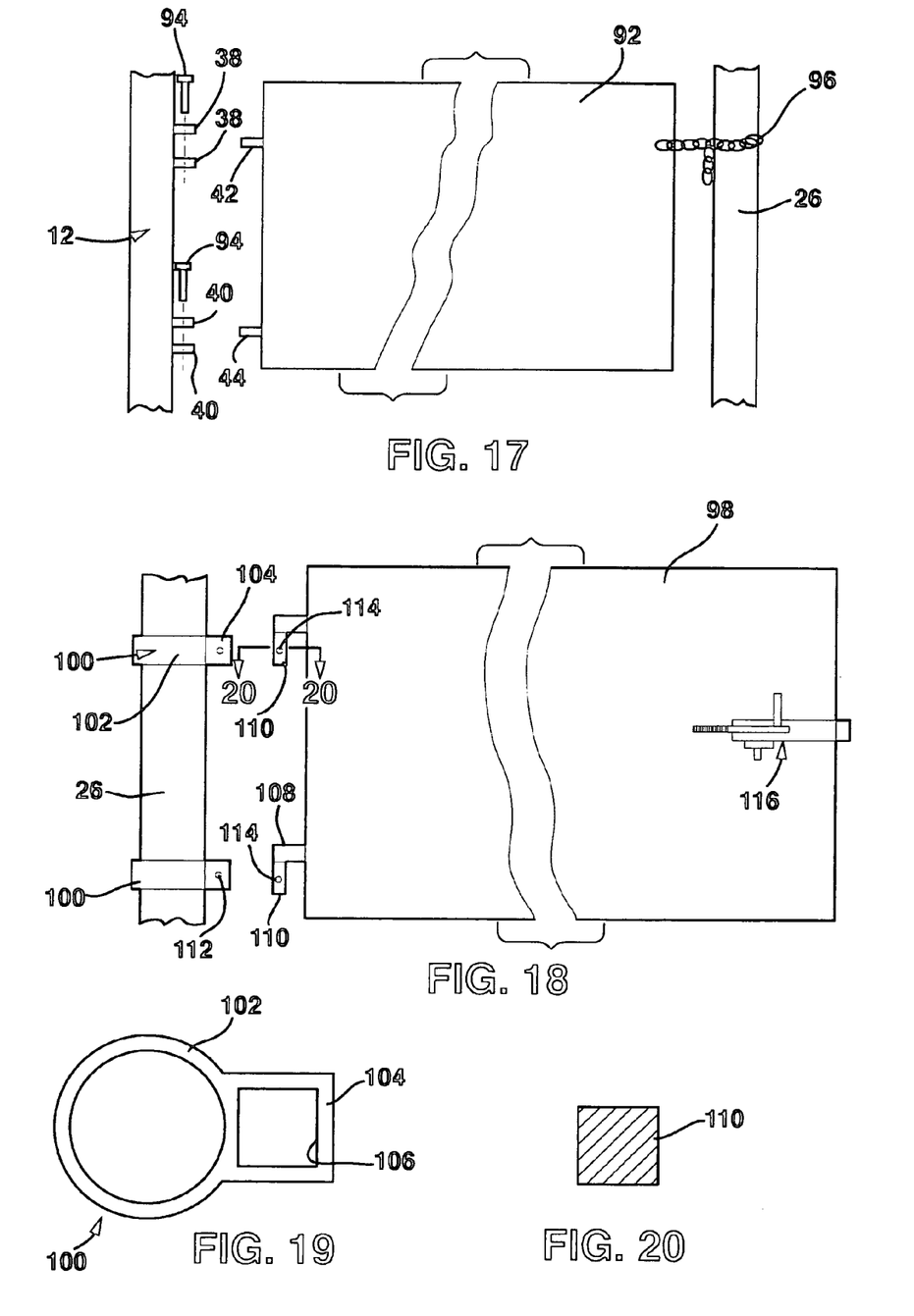
FIG. 17 is an elevational view of the alley way extension panel shown in FIG. 16.
FIG. 18 is an elevational view of a tub gate used with the present invention.
FIG. 19 is a detail view of a hinge for the gate shown in FIG. 18.
FIG. 20 is a cross-sectional view of a bar used to connect the gate to the hinge shown in FIG. 19.

An alley way extension panel 92 is mounted to one side of the alley way 12 and extends between the alley way 12 and the upright gooseneck 26. The panel 92 is shown in FIGS. 1, 16 and 17. The frame of alley way 12 is provided with an upper pair of spaced apart plates 38 and is further provided with a lower pair of spaced apart plates 40 which are spaced apart from the upper plates 38, as shown in FIG. 17. The panel 92 is provided with an upper tongue 42 and a lower tongue 44. The plates 38 and the plates 40 each have an aligned bore therethrough for receiving a connecting pin 94. The plates 38 and 40 and tongues 42 and 44 are used to secure the panel 92 to the alley way 12 in a manner similar to that for connecting adjacent panels 30 together. The tongues 42 and 44 are positioned to extend between the respective plates 38 and 40 so that when pin 94 is inserted through the holes provided in plates 38 and tongue 42 and another pin inserted through the holes provided in plates 40 and tongue 44 the panel 92 may be secured to the frame of alley way 12. The opposite end of panel 92 is connected to the upright gooseneck 26 with a chain 96 in a conventional manner, as shown in FIG. 17.

A hingedly mounted gate 98 is shown in FIGS. 1 and 18. The gate 98 is hingedly mounted to the upright gooseneck 26 with hinges 100. A top view of the hinge 100 is shown in FIG. 19. The hinge 100 includes a tubular structure 102 slidably receiving the upright gooseneck 26. A member 104 is secured to the tubular structure 102, as shown in FIG. 19. The member 104 has a square bore 106 extending therethrough. The gate 98 is provided with a pair of brackets 108 to which is attached a depending elongate bar 110, as shown in FIG. 18. The bar 110 has a square cross-section, as shown in FIG. 20, and is sized to be received by bore 106. The member 104 includes a transverse bore 112, as shown in FIG. 18, and the bar 110 also includes a transverse bore 114, as shown in FIG. 18. A pin is inserted through bores 112 and 114 to hold the bar 110 in the bore 106.

The gate 98 is hingedly connected to the upright gooseneck 26 by inserting the bars 110 into the bores 106 of the hinges 100. A pin (not shown) is inserted through the aligned bores 112 and 114 to secure the gate 98 to the hinge 100.

Figure 21:
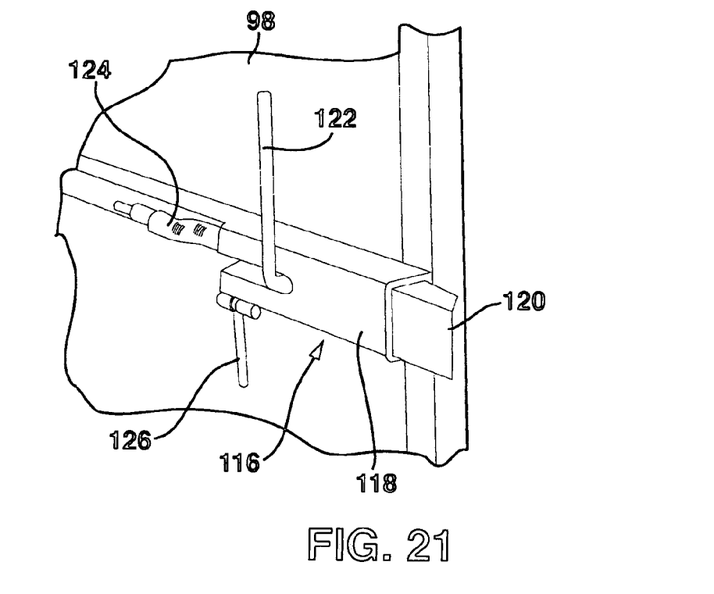
FIG. 21 is a detail photograph of a latch used with the gate according to the present invention.
Figure 22:
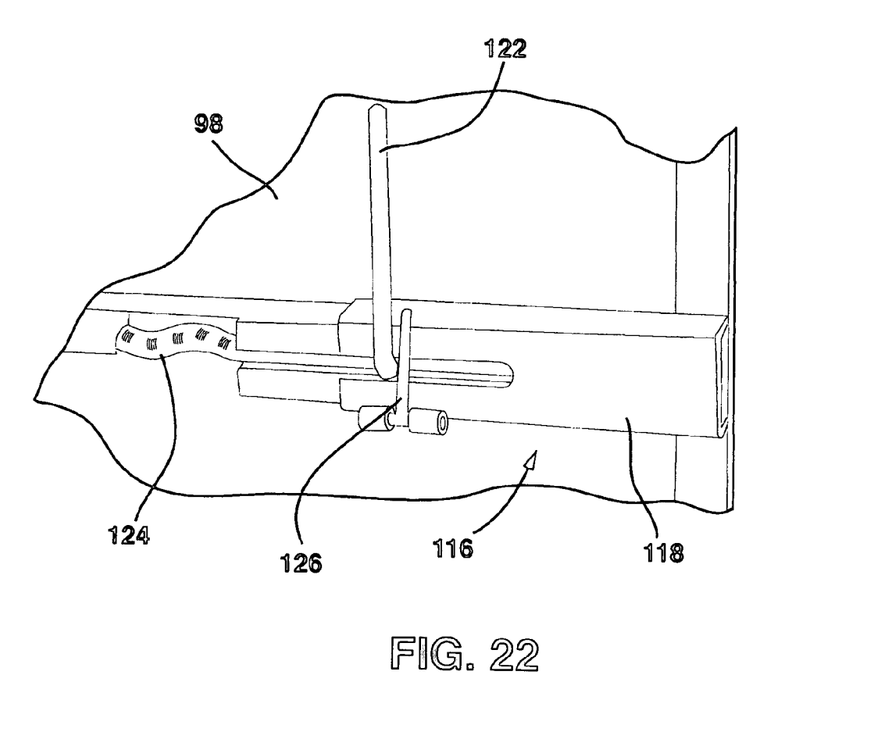
FIG. 22 is a detail photograph of the latch shown in FIG. 21 with a keep in a retracted position.

Further, the gate 98 includes a latch 116, as shown in FIGS. 18 and 21. A detail view of the latch 116 is shown in FIG. 21. The latch 116 includes a tubular body portion 118. A slidable keep 120 is positioned inside the tubular body 118. A handle 122 is mounted to the keep 120 so that the keep 120 can be retracted into the tubular body 118. A spring 124 provides a bias for extending the keep 120 outside the tubular body 118. A catch 126 is also provided for keeping the handle 122 in the retracted position, as shown in FIG. 22.

In using the latch 116, the gate 98 is rotated in the tub formed by the panels 30, and at a selected panel, the keep 120 of latch 116 is allowed to extend into the space provided between adjacent panels 30 so that the tub can be adjusted in size simply by swinging and latching the gate at a selected position.

Figure 23:
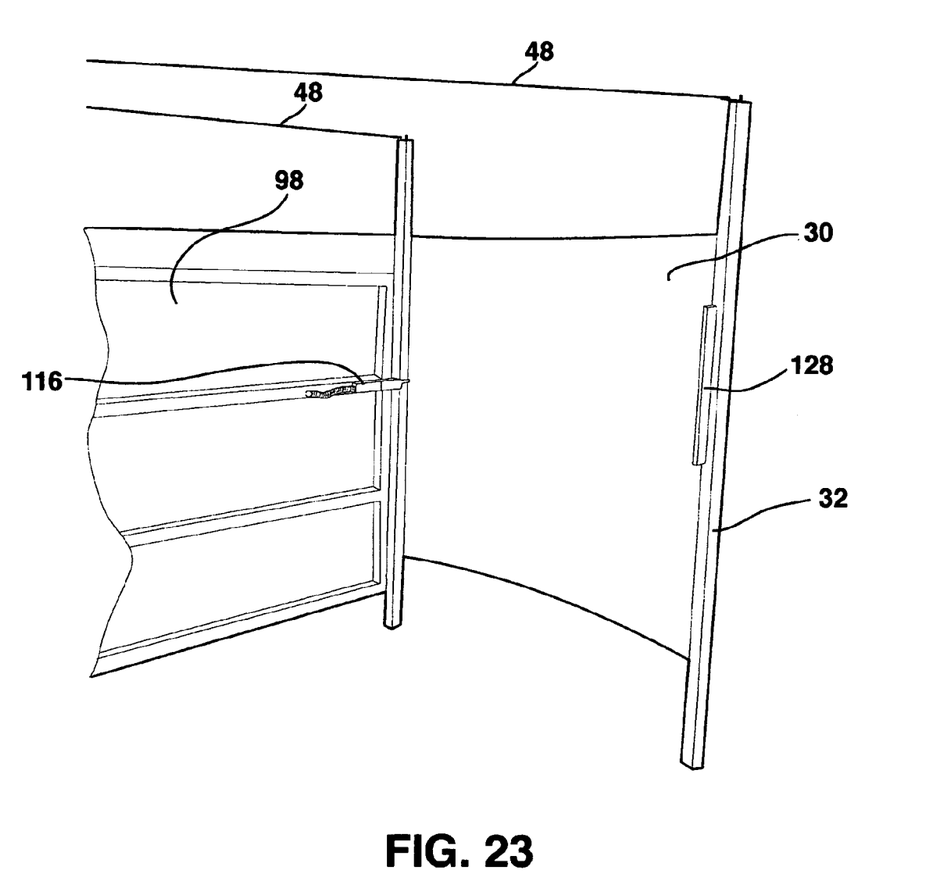
FIG. 23 is a detail photograph of an end panel used with the present invention.

With respect to the last panel 30 forming the tub 14, a latch plate 128 is welded to the upright standard 32 as shown in FIG. 23. The keep of latch 116 then engages the latch plate 128 so that the gate 98 is prevented from swinging past the last panel 30.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

I claim:

1. A portable alley way with collapsible crowding tub comprising:
    a fifth wheel gooseneck;
    an elongate alley way having opposed first and second sides with a top and a bottom and an opening at a first end and an opening at a second end;
    a collapsible crowding tub having an opening communicating with the opening at the second end of the alley way;
    the collapsible crowding tub comprising:
    a top brace extending from the top of the second end of the alley way to the fifth wheel gooseneck;
    a plurality of curved panels;
    means for releasibly connecting the curved panels together end-to-end in a substantially semi-circular pattern surrounding the fifth wheel hitch in equidistant and spaced-apart relation thereto and means for connecting an end curved panel to the first side of the alley way adjacent the opening at the second end of the alley way;
    an extension panel having one end connected to the second side of the alley way adjacent the opening at the second end of the alley way and having a second end connected to the fifth wheel gooseneck;
    a plurality of rod brace members, each rod brace member extending from the fifth wheel gooseneck to one of the curved panels;
    a gate having one end pivotally attached to the fifth wheel gooseneck;
    the gate having a length slightly less then the spaced apart distance of the curved panels from the fifth wheel gooseneck whereby the gate may swing in an arc within the semi-circular pattern of the curved panels; and
    means for latching the gate to a selected curved panel.

2. The portable alley way with crowding tub according to claim 1 wherein a first set of rod brace members are connected between the top of the fifth wheel gooseneck to the top of the curved panels and a second set of rod brace members are connected between the bottom of the fifth wheel gooseneck to the bottom of the curved panels.

3. The portable alley way with crowding tub according to claim 1 further including hydraulic means for raising and lowering the alley way between a work position on a ground surface and a transport position raised above the ground surface.

* * * * *